(12) United States Patent
Battista et al.

(10) Patent No.: US 9,361,489 B2
(45) Date of Patent: Jun. 7, 2016

(54) VOLTAGE AND POWER LIMITER FOR AN ELECTROMAGNETIC TRANSPONDER

(71) Applicant: STMicroelectronics (Rousset) SAS, Rousset (FR)

(72) Inventors: Marc Battista, Marseilles (FR); Gilles Bas, Rousset (FR); Francois Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 14/739,814

(22) Filed: Jun. 15, 2015

(65) Prior Publication Data

US 2016/0004890 A1     Jan. 7, 2016

(30) Foreign Application Priority Data

Jul. 2, 2014   (FR) ...................................... 14 56333

(51) Int. Cl.
*G06K 7/10* (2006.01)
*G06K 19/07* (2006.01)
*H04B 1/18* (2006.01)

(52) U.S. Cl.
CPC ........ *G06K 7/10158* (2013.01); *G06K 19/0715* (2013.01); *H04B 1/18* (2013.01)

(58) Field of Classification Search
CPC ............... H02M 1/4233; H02M 7/219; G06K 7/10158; G06K 19/0715
See application file for complete search history.

(56) References Cited

U.S. PATENT DOCUMENTS

| | | |
|---|---|---|
| 2010/0063347 A1 | 3/2010 | Yomtov et al. |
| 2010/0096736 A1* | 4/2010 | Tadokoro ............ H01L 27/0814 257/679 |
| 2010/0190435 A1 | 7/2010 | Cook et al. |
| 2014/0063666 A1 | 3/2014 | Kallal et al. |

* cited by examiner

*Primary Examiner* — Curtis Odom
(74) *Attorney, Agent, or Firm* — Seed IP Law Group PLLC

(57) ABSTRACT

An electromagnetic transponder including a resonant circuit; a rectifying bridge having input terminals connected across the resonant circuit and having rectified output terminals providing an electronic circuit power supply voltage; and a device for limiting the voltage across the resonant circuit, connected between the input terminals of the rectifying bridge.

14 Claims, 3 Drawing Sheets

VOLTAGE AND POWER LIMITER FOR AN ELECTROMAGNETIC TRANSPONDER

BACKGROUND

1. Technical Field

The present disclosure generally relates to electronic circuits and, more specifically, to electromagnetic transponders or electronic tags (TAG).

2. Description of the Related Art

Communication systems with electromagnetic transponders are more and more frequent, particularly since the development of near-field communication (NFC) technologies.

Such systems use the power generated by a radio frequency field of a terminal to communicate with and most often to power an electromagnetic transponder.

To protect the electronic circuits of the transponder against overvoltages or too high powers that its antenna would receive from the terminal, voltage-limiting circuits are generally provided.

BRIEF SUMMARY

An embodiment improves all or part of the disadvantages of known techniques of power or voltage limitation in an electromagnetic transponder.

An embodiment provides a solution avoiding the use of a high-voltage rectifying bridge.

An embodiment provides a solution requiring no modification of the data interpretation circuits on the transponder side.

An embodiment provides a solution preserving the modulation of the radio frequency signal.

Thus, an embodiment provides an electromagnetic transponder comprising:

- a resonant circuit;
- a rectifying bridge having input terminals connected across the resonant circuit and having rectified output terminals providing a voltage for powering electronic circuits; and
- a device for limiting the voltage across the resonant circuit, connected between the input terminals of the rectifying bridge.

According to an embodiment, the limiting device comprises a circuit of detection of the peak voltage of the signal across the resonant circuit and of comparison with respect to a threshold, said circuit controlling an element of adjustable impedance, connected between the input terminals of the rectifying bridge.

According to an embodiment, a filtering circuit is interposed between the peak voltage detection circuit and the impedance.

According to an embodiment, the filter has a time constant when the detected voltage decreases, which is greater by a ratio of at least 10 than its time constant when the detected voltage increases.

According to an embodiment, the transponder further comprises a charge pump circuit increasing the control voltage of the adjustable impedance.

According to an embodiment, said threshold is adjustable between a first and a second greater value, the second value being used when the transponder circuits are in retromodulation mode.

The foregoing and other features and advantages will be discussed in detail in the following non-limiting description of specific embodiments in connection with the accompanying drawings.

DETAILED DESCRIPTION

Figure 1:
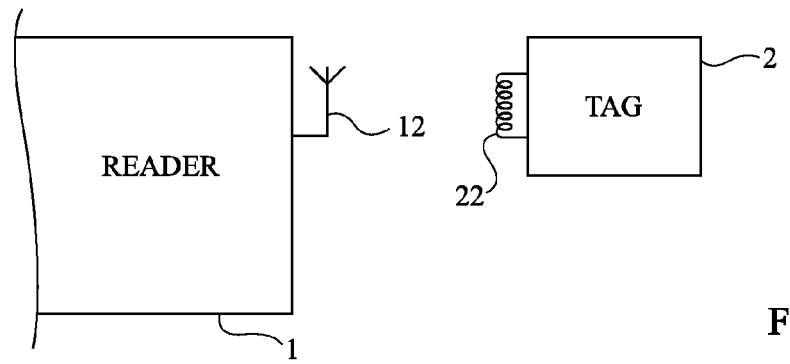
FIG. 1 is a very simplified representation in the form of blocks of an example of an electromagnetic transponder system of the type to which the embodiments which will be described apply as an example.

The same elements have been designated with the same reference numerals in the different drawings.

For clarity, only those steps and elements which are useful to the understanding of the embodiments to be described have been shown and will be detailed.

In particular, the generation of the radio frequency signals and their interpretation on the terminal side and on the transponder side have not been detailed, the described embodiments being compatible with usual techniques of generation and interpretation of these signals. In the following description, when reference is made to terms approximately, about, and in the order of, this means to within 10%, and preferably to within 5%.

FIG. 1 is a simplified view, in the form of blocks, of an example of a contactless near field communication system (NFC). A reader 1 (READER) comprises various electronic circuits for generating a radio frequency signal transmitted by means of an antenna 12. The radio frequency field generated by the terminal or reader 1 is detected by one or a plurality of electromagnetic transponders, for example, an electronic tag 2 (TAG) located in the range. Tag 2 itself comprises an antenna 22. Tag 2 generally extracts the power for the operation of the circuits that it comprises from the radio frequency field generated by terminal 1.

For a communication in the direction from terminal 1 to transponder 2, terminal 1 modulates, generally in amplitude, the remote supply carrier (typically at 13.56 MHz). In the direction from transponder 2 to terminal 1, the communication is performed by modification of the load (retromodulation) formed by the transponder on the oscillating circuit of the terminal, for example, in amplitude modulation or in phase modulation.

According to the distance between terminal 1 and transponder 2, the power of the field received by transponder 2 strongly varies. This generates significant variations of the voltage developed across the antenna of transponder 2. This voltage capable of reaching several tens of volts may exceed the voltage that the electronic circuits of transponder 2 are capable of withstanding, which is a few volts only.

Figure 2:
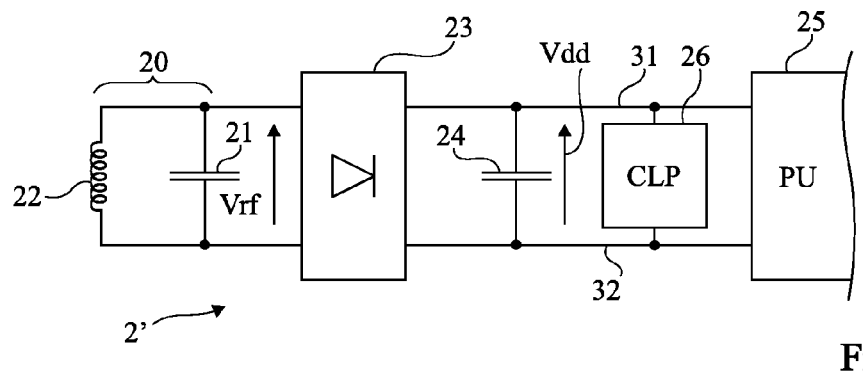
FIG. 2 is a block diagram partially illustrating an example of a usual electromagnetic transponder equipped with a voltage-limiting element.

FIG. 2 is a simplified electric diagram of an example of a conventional electronic tag 2'. Such a tag 2' comprises a generally parallel resonant circuit 20, formed of an inductive winding forming antenna 22 in parallel with a capacitive element 21. This resonant circuit senses the radio frequency field of a terminal comprising it in its range. Voltage Vrf recovered across the resonant circuit is rectified by a rectifying bridge 23 (generally a fullwave diode bridge). The rectified output of bridge 23 delivers a voltage Vdd, filtered by a capacitive element 24. Voltage Vdd forms (possibly via a voltage regulator, not shown) the power supply voltage of one or a plurality of electronic circuits 25 (PU) of transponder 2, among which, generally, a unit for processing the signals received from the terminal and for generating the retromodulation signals.

To avoid for voltage Vdd to reach values prejudicial to circuits 25, a circuit 26 (CLP) for limiting voltage Vdd is generally provided. Thus, when the conditions of coupling between the transponder and a terminal result in too high a voltage Vrf developed across the antenna, circuit 26 clips voltage Vdd to limit it to an acceptable value.

Usual voltage-limiting circuits are for example formed of a Zener diode or of a MOS transistor controlled by a circuit detecting the value of voltage Vdd.

A solution such as described in relation with FIG. 2 requires for the elements forming rectifying bridge 23 and, more generally, all the elements on the antenna side with respect thereto, to be capable of withstanding the possible overvoltages seen by the antenna. In particular, the diodes or equivalent elements performing this function will need to withstand such overvoltages, which may reach several tens of volts.

Another problem occurs under the effect of the radio frequency signal modulation. Indeed, it being an amplitude modulation, if its high state is clamped but its low state falls back under the threshold of the limiting element and thus is not clipped, this generates a decrease in the amplitude of the modulation capable of being detected by circuit 25. The thresholds of the high and low states of the amplitude demodulator equipping circuit 25 on the transponder side thus generally have to be made closer to each other, which makes the circuit sensitive to noise.

Figure 3:
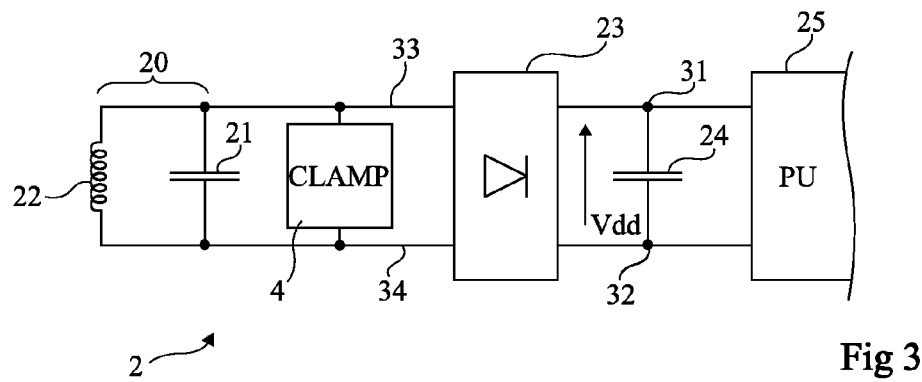
FIG. 3 schematically shows in the form of blocks an embodiment of an electromagnetic transponder equipped with a circuit for limiting the received power.

FIG. 3 is a simplified electric diagram of an embodiment of a transponder 2 equipped with a power-limiting circuit.

It shows a resonant circuit 20, formed of an inductive winding or antenna 22 and of a capacitive element 21, for example, in parallel, connected to input terminals 33 and 34 of a rectifying bridge 23. Rectified outputs 31 and 32 of bridge 23 are connected to the power supply terminals of processing unit 25, a capacitor 24 filtering output voltage Vdd of bridge 23.

According to this embodiment, a power-limiting circuit 4 (CLAMP) is connected between terminals 33 and 34 upstream of rectifying bridge 23.

The fact of limiting the voltage upstream of the bridge (on the antenna side) has many advantages, among which:
 a protection of antenna 22 against too high a power;
 a limitation of the heating of the circuits forming the rectifying bridge in the presence of a significant field; and
 a decrease in the number of elements intended to withstand a high voltage, and thus a decrease in the surface area occupied by the integrated circuits.

It could have been devised to place a protection diode (for example, a Zener diode) directly across the antenna. However, such a diode would clamp the signal and would still have the disadvantage of attenuating the modulation. Further, this diode should be oversized due to the voltages to be withstood.

The inventors provide forming limiting circuit 4 in the form of an impedance on the antenna having its value controlled by the peak voltage thereacross. In other words, a circuit 4 having a constant impedance across the antenna, independently from the fact that the protection is active or not, is provided. Accordingly, the activation of protection circuit 4 comprises decreasing the resistance that it has across antenna 22 to limit the maximum voltage and thus limit the maximum absorbed power.

Figure 4:
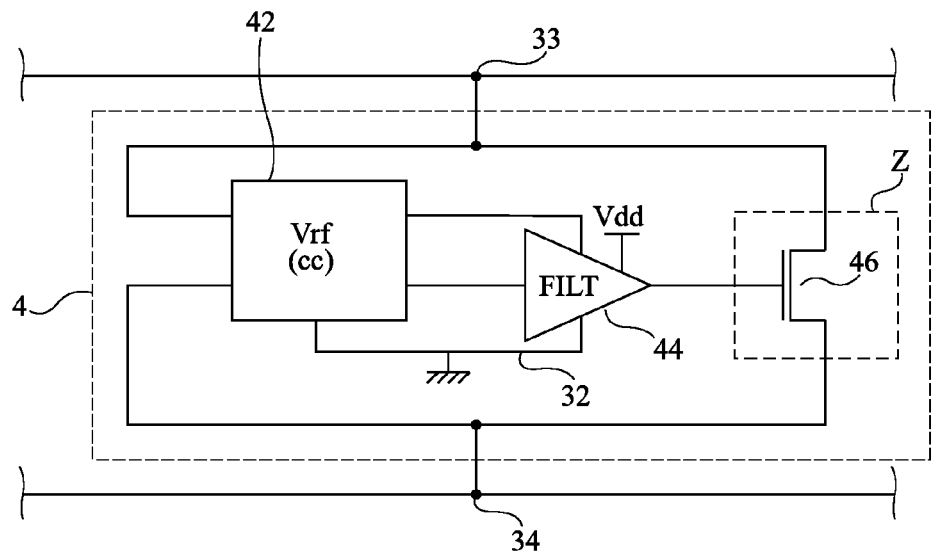
FIG. 4 is a block diagram illustrating an embodiment of the limiting circuit of FIG. 3.

FIG. 4 is a block diagram of an embodiment of a circuit 4 for limiting radio frequency voltage Vrf upstream of the rectifying bridge (23, FIG. 3).

Device 4 comprises a circuit 42 (Vrf (cc)) for detecting peak voltage Vrf, having two input terminals directly connected to terminals 33 and 34. Circuit 4 also comprises an amplifier 44 (FILT) for filtering the output of circuit 42. Filter 44 should have the characteristic of having a fast response (low time constant) on increase of the peak-to-peak voltage beyond a threshold, and a slower response (higher time constant) on decrease of this voltage, to filter the modulation on the field control. In practice, the decrease time constant of the filter should be greater than the duration of a symbol transmitted by the radio frequency modulation. The increase time constant is for example from 10 to 100 times smaller than the time constant of the filter in falling in decrease mode. Filter-amplifier 44 is powered with voltage Vdd or by another power supply source directly generated from the antenna.

The output of filter 44 controls a variable impedance Z formed, in this example, of a MOS transistor 46 having its drain and source directly connected to terminals 33 and 34 and having its gate connected to the output of amplifier 44. When the field sensed by the antenna increases, peak voltage Vrf tends to increase. A corresponding decrease of impedance Z (by increasing the gate voltage of transistor 46) then decreases voltage Vrf.

As compared with conventional solutions of the type in FIG. 2, an advantage is that all the components downstream of rectifying bridge 23, including the rectifying elements of this bridge, do not need to withstand an overvoltage, it being filtered before the bridge. Further, heatings on the antenna are thus limited by dissipating, in element 46, the possible overvoltage. Further, the amplitude of the modulation is preserved.

Figure 5:
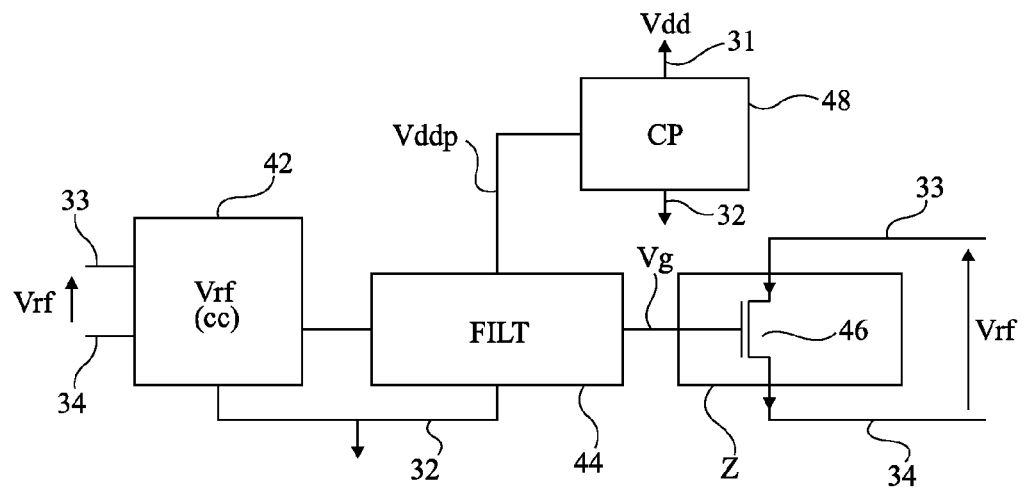
FIG. 5 is a block diagram illustrating another embodiment of the limiting circuit of FIG. 3.

FIG. 5 is a block diagram of a power-limiting device 4 to be placed upstream of a rectifying bridge in an electromagnetic transponder.

As compared with the embodiment of FIG. 4, a difference is that a charge pump circuit 48 (CP) is used to increase the amplitude of control voltage Vg of transistor 46, (preferably by a ratio in the order of 10). In practice, circuit 48, powered by voltage Vdd, delivers a higher power supply voltage Vddp to filter 44. This enables to decrease the size of transistor 46 as compared with the embodiment of FIG. 4. Further, since charge pump circuit 48 has the function of only delivering a gate voltage, its power consumption is very low and the size of the capacitive elements that it comprises needs not be significant. In particular, the inventors consider that the surface area occupied by charge pump circuit 48 is negligible as compared with the surface area gain on the side of transistor 46.

Figure 6:
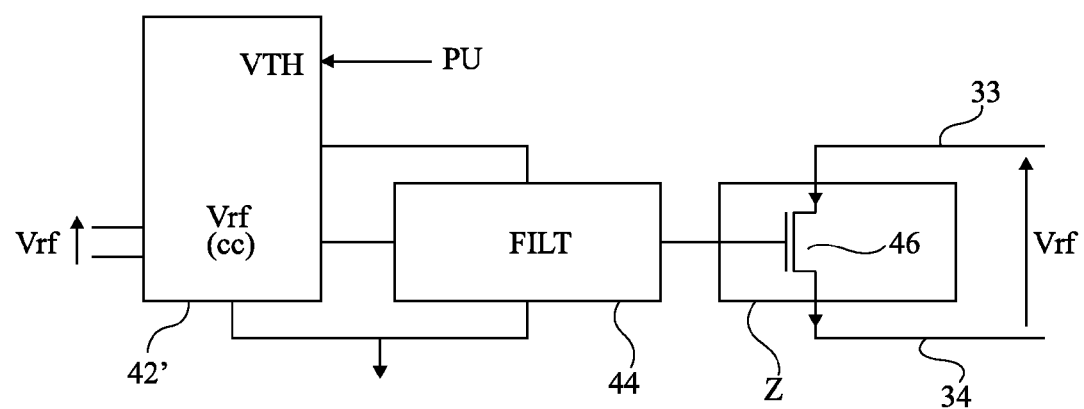
FIG. 6 is a block diagram illustrating still another embodiment of the limiting circuit of FIG. 3.

FIG. 6 is a block diagram of still another embodiment of the limiting circuit. According to this embodiment, peak voltage detector 42' is associated with an element of dynamic adjustment of the triggering threshold (VTH). The control originates from digital circuits PU of the transponder and aims at increasing the triggering threshold during retromodulation periods. Thus, the triggering of the protection is performed from a first value outside of retromodulation periods and from a second value during retromodulation periods, the second value being greater than the first one. An advantage is to thus improve the visibility of the tag for the reader.

The price to pay is a slight increase of the power consumption for the case where the retromodulation only concerns states zero. However, statistically, the response is balanced between high states and low states. In such a case, it is only increased by half the power consumed during retromodulation periods. For example, considering a threshold around 4 volts in no-retromodulation operation and passing to a 6-volt threshold during retromodulation periods, there statistically is no power increase.

The embodiments of FIGS. 5 and 6 may be combined.

Various embodiments have been described. Various alterations, modifications, and improvements will readily occur to those skilled in the art. In particular, the selection of the value of the triggering thresholds of protection circuit 4 depends on the breakdown voltage of the transponder components, on the maximum temperature not to be exceeded (proportional to the absorbed power), and may vary from one application to another. Further, the practical implementation of the described embodiments is within the abilities of those skilled in the art by using the functional indications given hereabove and by using electronic components usual per se.

Such alterations, modifications, and improvements are intended to be part of this disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An electromagnetic transponder comprising:
   a resonant circuit;
   a rectifying bridge having input terminals electrically coupled across the resonant circuit and having rectified output terminals configured to provide a voltage for powering an electronic circuit; and
   a limiter configure to limit a voltage across the resonant circuit, electrically coupled between the input terminals of the rectifying bridge, wherein the limiter includes a detection circuit configured to compare the voltage across the resonant circuit with a threshold that is adjustable between first and second values, the second value being greater than the first value.

2. The transponder of claim 1, wherein the limiter comprises an adjustable impedance element electrically coupled between the input terminals of the rectifying bridge, the detection circuit being configured to adjust an impedance of the adjustable impedance element.

3. The transponder of claim 2, wherein the limiter includes a filter interposed between the detection circuit and the adjustable impedance element.

4. The transponder of claim 3, wherein the filter has a first time constant when the voltage across the resonant circuit decreases and a second time constant when the voltage across the resonant circuit increases, the first time constant being at least ten times greater than the second time constant.

5. The transponder of claim 2, wherein the limiter includes a charge pump circuit configured to provide a boosted control voltage for adjusting the adjustable impedance element.

6. The transponder of claim 1, further comprising a control circuit configured to set the threshold at the second value when the transponder is in a retromodulation mode.

7. The transponder of claim 1, wherein the voltage across the resonant circuit in which the detection circuit is configured to compare with the threshold is a peak voltage.

8. A device comprising:
   a resonant circuit;
   a rectifying bridge configured to rectify a voltage across the resonant circuit; and
   a limiter configure to limit the voltage across the resonant circuit, electrically coupled between the input terminals of the rectifying bridge, wherein the limiter includes a detection circuit configured to compare the voltage across the resonant circuit with a threshold that is adjustable between first and second values, the second value being greater than the first value.

9. The device of claim 8, wherein the limiter comprises an adjustable impedance element electrically coupled between the input terminals of the rectifying bridge, the detection circuit being configured to adjust an impedance of the adjustable impedance element.

10. The device of claim 9, wherein the limiter includes a filter interposed between the detection circuit and the adjustable impedance element.

11. The device of claim 10, wherein the filter has a first time constant when the voltage across the resonant circuit decreases and a second time constant when the voltage across the resonant circuit increases, the first time constant being at least ten times greater than the second time constant.

12. The device of claim 9, wherein the limiter includes a charge pump circuit configured to provide a boosted control voltage for adjusting the adjustable impedance element.

13. The device of claim 8, further comprising a control circuit configured to set the threshold at the second value when the device is in a retromodulation mode.

14. The device of claim 8, wherein the voltage across the resonant circuit in which the detection circuit is configured to compare with the threshold is a peak voltage.

* * * * *